United States Patent
Xu et al.

(10) Patent No.: US 11,010,560 B2
(45) Date of Patent: May 18, 2021

(54) MULTI-RESOLUTION CONVOLUTIONAL NEURAL NETWORKS FOR SEQUENCE MODELING

(71) Applicant: INTERNATIONAL BUSINESS MACHINES CORPORATION, Armonk, NY (US)

(72) Inventors: Song Xu, Beijing (CN); Zhili Guo, Beijing (CN); HongLei Guo, Beijing (CN); Shiwan Zhao, Beijing (CN); Pitipong Jun Sen Lin, Brookline, MA (US); Elaine Branagh, Austin, TX (US); Zhong Su, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 99 days.

(21) Appl. No.: 16/184,227

(22) Filed: Nov. 8, 2018

(65) Prior Publication Data
US 2020/0151250 A1    May 14, 2020

(51) Int. Cl.
*G06F 40/30* (2020.01)
*G06F 40/20* (2020.01)
(Continued)

(52) U.S. Cl.
CPC .............. *G06F 40/30* (2020.01); *G06N 3/08* (2013.01)

(58) Field of Classification Search
CPC ...... G06F 40/30; G06F 40/169; G06F 40/274; G06F 16/3329; G06F 40/205; G06F 16/3344; G06F 16/24575; G06F 16/3334; G06F 16/3347; G06F 40/20; G06F 40/295; G06F 40/35; G06F 40/56
(Continued)

(56) References Cited

U.S. PATENT DOCUMENTS

| 10,169,315 B1* | 1/2019 | Heckel .................. G06F 40/166 |
| 2017/0192956 A1* | 7/2017 | Kaiser .................. G06N 3/0445 |

(Continued)

FOREIGN PATENT DOCUMENTS

| CN | 107092596 A | 8/2017 |
| CN | 107169035 A | 9/2017 |
| CN | 107180247 A | 9/2017 |

OTHER PUBLICATIONS

Zhou, "A C-LSTM Neural Network for Text Classification", arXiv:1511.08630v2, Nov. 2015, 10 pages.
(Continued)

*Primary Examiner* — Richemond Dorvil
*Assistant Examiner* — Rodrigo A Chavez
(74) *Attorney, Agent, or Firm* — Tutunjian & Bitetto, P.C.; Joseph Petrokaitis

(57) ABSTRACT

Methods and systems for natural language processing include generating respective feature vectors, for each word in an input, based on sequences of input words of different respective lengths. The respective feature vectors for each word in the input are combined to form a combined vector for each word. A hidden state is determined for each word in the input based on the combined vector. The hidden states for all words in the input are combined to form a multi-resolution context vector. A natural language processing action is performed using the multi-resolution context vector.

14 Claims, 6 Drawing Sheets

(51) Int. Cl.
*G06F 40/56* (2020.01)
*G06N 3/08* (2006.01)

(58) Field of Classification Search
USPC .............................................................. 704/9
See application file for complete search history.

(56) References Cited

U.S. PATENT DOCUMENTS

2017/0278510 A1* 9/2017 Zhao ........................ G10L 15/04
2018/0143966 A1* 5/2018 Lu .......................... G06K 9/4671
2018/0260698 A1* 9/2018 Lin ...................... G06F 16/5866

OTHER PUBLICATIONS

Wang, "Attention-based LSTM for Aspect-level Sentiment Classification", Proceedings of the 2016 Conference on Empirical Methods in Natural Language Processing, Nov. 2016, pp. 606-615.
Yin, "Multichannel Variable-Size Convolution for Sentence Classification", arXiv:1603.04513, Mar. 2016, 11 pages.

* cited by examiner

MULTI-RESOLUTION CONVOLUTIONAL NEURAL NETWORKS FOR SEQUENCE MODELING

BACKGROUND

Technical Field

The present invention generally relates to natural language processing and, more particularly, to multi-resolution convolution for sequence modeling.

Description of the Related Art

Natural language processing includes a wide variety of applications, such as machine translation, language modeling, and sentiment classification. In each case, meaning can be extracted from sentences using more context than simple per-word definitions. Instead, the grammar and other words in the sentence color the meaning of particular terms. Thus, sequences of words are modeled to improve accuracy of the natural language processing output.

SUMMARY

Methods and systems for natural language processing include generating respective feature vectors, for each word in an input, based on sequences of input words of different respective lengths. The respective feature vectors for each word in the input are combined to form a combined vector for each word. A hidden state is determined for each word in the input based on the combined vector. The hidden states for all words in the input are combined to form a multi-resolution context vector. A natural language processing action is performed using the multi-resolution context vector.

A system for natural language processing includes a first neural network configured to generate respective feature vectors, for each word in an input, based on sequences of input words of different respective lengths. A vector combining module is configured to combine the respective feature vectors for each word in the input to form a combined vector for each word. A second neural network is configured to determine a hidden state for each word in the input based on the combined vector. The vector combining module is further configured to combine the hidden states for all words in the input to form a multi-resolution context vector. A natural language processing module is configured to perform a natural language processing action using the multi-resolution context vector.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide sequence modeling for natural language processing applications using a convolution of kernels of multiple sizes to capture sentence structure at different levels of granularities. This generates a set of feature maps for each position in the sentence that are added together with multi-resolution attention weights to produce the input of a recurrent neural network that generates a context vector.

When addressing the meaning of a particular sentence, the number of words in the sequence can have a dramatic effect on the recognized meaning. For example, in the sentence, "The service is not bad," a single-word attention may recognize the terms "service" and "bad," while phrase-level attention (e.g., sequences having a length of two words) would be able to recognize "not bad." Similarly, in the sentence, "The food is good, but it is not a relaxing place to go," the single-word attention could recognize "good" and "relaxing," but a four-word attention would be able to recognize, "not a relaxing place." In the latter example, however, using exclusively a four-word attention would not necessarily capture the shorter description of the food being good. Thus, the present embodiments use kernels of multiple different sizes on the input, with a convolutional step being used to generate feature vectors that are a sum of the weighted contributions of each kernel size.

Figure 1:
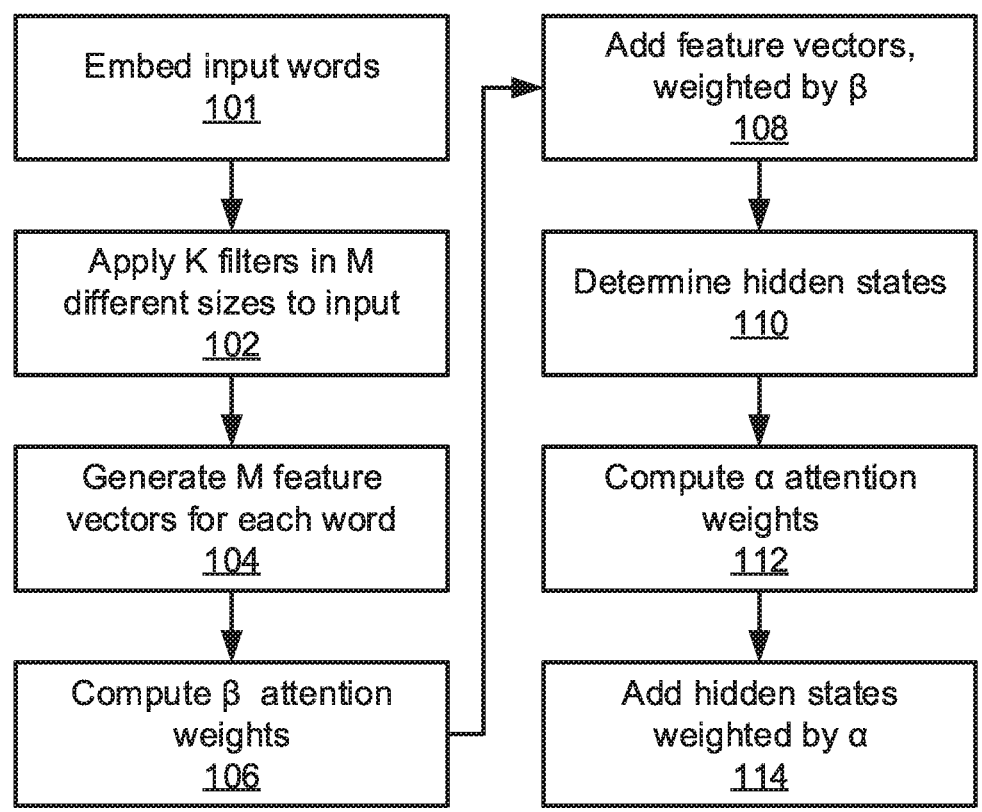
FIG. 1 is a block/flow diagram of a method for determining a context vector for words in an input text using multiple granularities of sequence length in accordance with an embodiment of the present invention.

Referring now to FIG. 1, a method of determining a context vector using multi-resolution attention is shown. Block 101 embeds the words in an input as vectors in a multi-dimensional space. In one example, the words may be represented in a semantic space where words having similar meanings are located closer to one another in the semantic space than words having disparate meanings. Any appropriate tool can be used to perform this embedding, such as word2vec.

Block 102 applies a set of K filters to an input sentence, with each filter being applied across sequences of M different lengths. For example, in an embodiment with M=3 lengths, the K filters can be applied to sequences that are three, five, and seven words long. At the beginning and end of the input, where there may not be sufficient words in the sentence to fill the sequence, the extra spaces can be padded. For example, for a five-word sequence that is centered at the first word of an input sentence, the sequence can be represented as, <padding, padding, $w_1, w_2, w_3$>, where each word in the input is represented as $w_i$, i=[1, . . . , n], and n is the number of words in the input. An exemplary value for the number of filters can be K=256. This is repeated for each word in the input. Although it is specifically contemplated that a convolutional neural network can be sued at this stage, it should be understood that any appropriate system can be used instead.

As a general matter, each of the filters can be represented by a weight matrix. For example, for a five-word sequence, the size of the matrix can be $5N_{emb}$, where $N_{emb}$ is the size of the word embedding. Each of the K filters for each filter size can be randomly initialized or can, alternatively, be initialized to some default value. The values of the filters are updated during the training process to reflect the training data.

Block 104 uses the outputs of the filters to generate M feature vectors for each word in the input, each vector having K entries. Thus, for each word and at each sequence size, the outputs of all K filters are assembled to form a single feature vector $f_{im}$, where $m=[1, \ldots, M]$. Block 106 then determines the attention weights $\beta_{im}$ for each word $w_i$. Taking the list of feature vectors $f_{im}$, the weights $\beta_{im}$ are calculated as $\beta_{im}=\text{softmax}(u^T(Wf_{im}))$, where W is a K×K parameter matrix and u is a parameter vector of length K. These parameter values can be randomly initialized or can be initialized to some default value and are updated during training.

An aggregated feature vector for each word $w_i$ is determined by block 108 as $v_i=\Sigma_{m=1}^M \beta_{im} f_{im}$. Block 110 uses the aggregated feature vectors $v_i$ to determine a hidden state $h_i$ for each word $w_i$ in the input, using a recurrent neural network. It is specifically contemplated that the recurrent neural network can be a long short-term memory network.

Block 112 computes an attention weight $\alpha_i$ for each word $w_i$ in the input in a manner similar to the calculation of the attention weights $\beta_{im}$ described above. Block a context vector as the aggregation of the hidden states $c=\Sigma_{i=1}^n \alpha_i h_i$. This context vector can be used for natural language processing applications such as, e.g., classification or translation.

Figure 2:
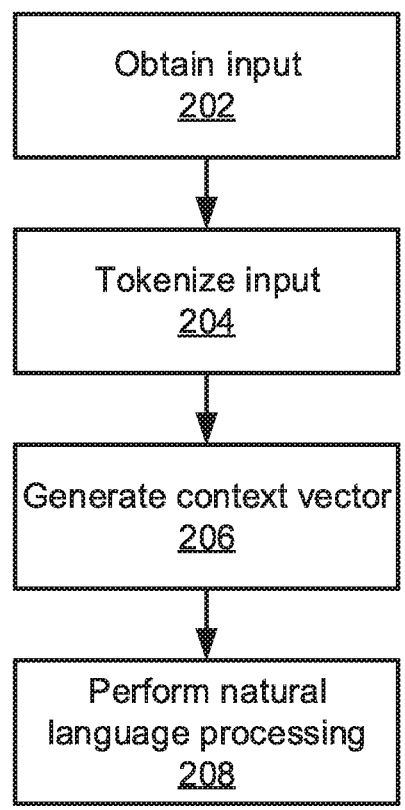
FIG. 2 is a block/flow diagram of a method for performing natural language processing using a multi-resolution context vector in accordance with an embodiment of the present invention.

Referring now to FIG. 2, a method for performing natural language processing is shown. Block 202 obtains an input sequence using any appropriate mechanism. In some embodiments, the input sequence can be obtained directly as strings of text, for example as input by a user in a chat window. In other embodiments, the input sequence can be obtained by automatic speech recognition, for example by recording a user's speech with a microphone, digitizing the audio, and recognizing the words in the audio using any appropriate speech recognition tool. Block 204 tokenizes the input, breaking it into discrete word units. This process will depend on the syntax of the language in question. For example, in English language text, words are separated by spaces and by certain punctuation. The entire input can be further broken up into segments, for example breaking a large piece of text into individual sentences that are evaluated independently.

Block 206 generates a context vector for the input. In some embodiments, the context vector may characterize the entire input text. In other embodiments, where the input text has been broken up into sentences, the context vector may represent a single sentence. Block 208 uses the context vector to perform natural language processing. In one specific example, block 208 can use the context vector as input to a full connection layer, followed by a sigmoid function, to compute a probability for a binary sentiment classification (e.g., determining whether the input represents a positive or a negative sentiment).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process. The present embodiments can use convolutional neural networks (CNNs) during the application of filters to the input in block 102 and recurrent neural networks (RNNs) during the determination of hidden states in block 110.

Figure 3:
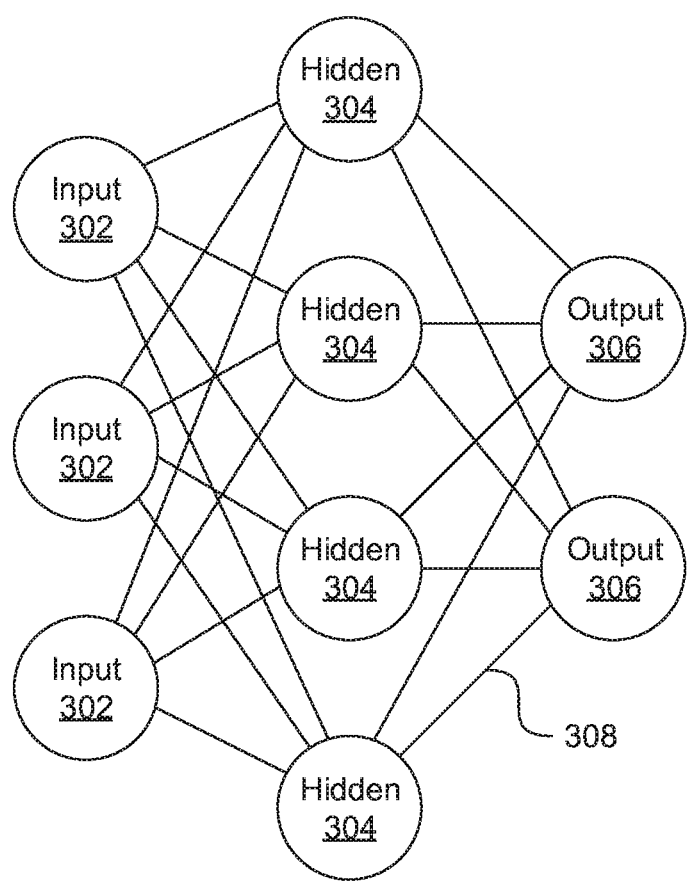
FIG. 3 is a high-level diagram of an illustrative neural network in accordance with an embodiment of the present invention.

Referring now to FIG. 3, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted and these weighted inputs are then processed by the hidden neurons 304 according to some function in the hidden neurons 304, with weighted connections 308 between the layers. There may be any number of layers of hidden neurons 304, and as well as neurons that perform different functions. There exist different neural network structures as well, such as convolutional neural network, maxout network, etc. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "feed-back" computation, where the hidden neurons 304 and input neurons 302 receive information regarding the error propagating backward from the output neurons 306. Once the backward error propagation has been completed, weight updates are performed, with the weighted connections 308 being updated to account for the received error. This represents just one variety of ANN.

Figure 4:
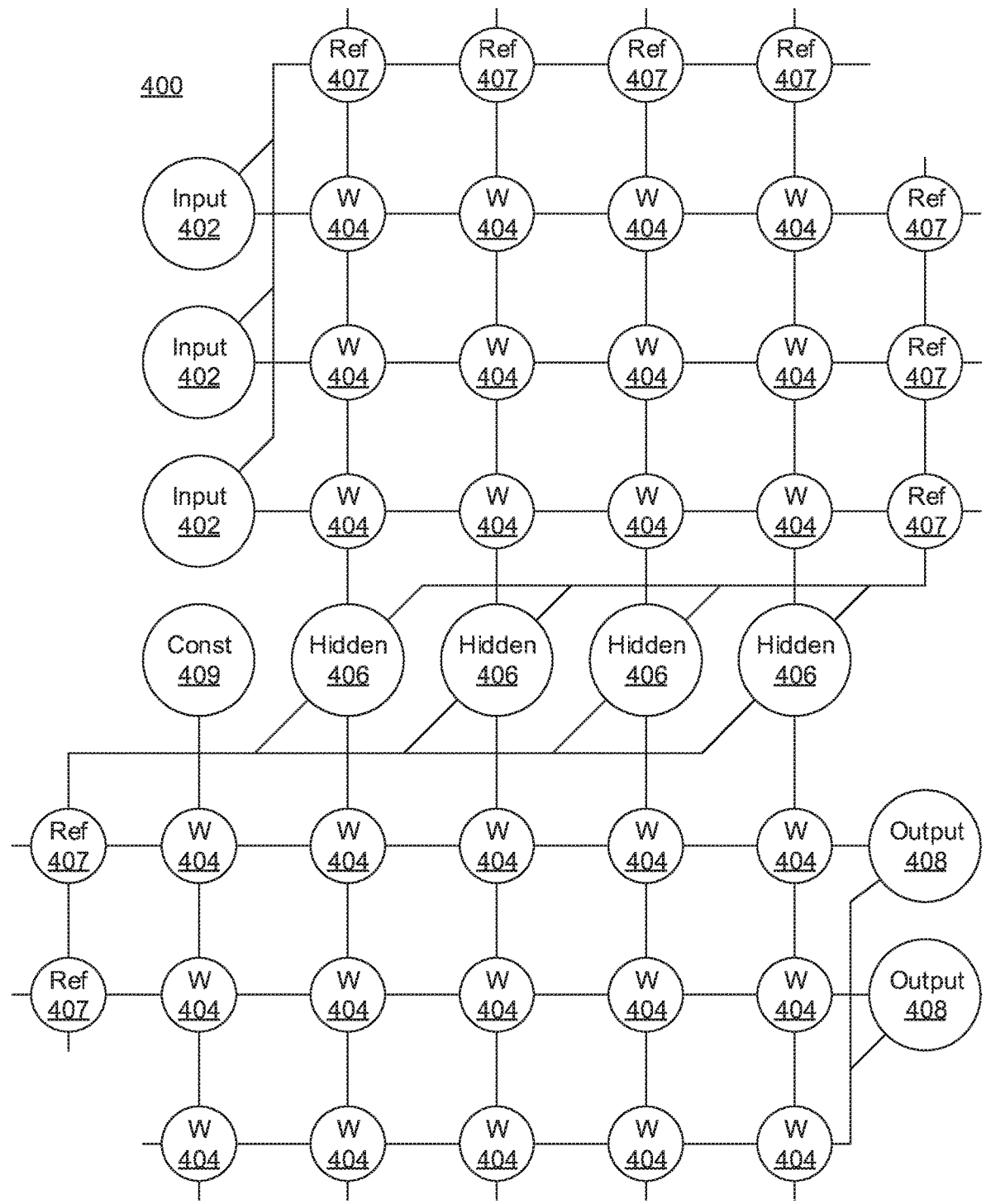
FIG. 4 is a more detailed diagram of the structure of an illustrative neural network in accordance with an embodiment of the present invention.

Referring now to FIG. 4, an exemplary ANN architecture 400 is shown. It should be understood that the present architecture is purely exemplary and that other architectures or types of neural network may be used instead. The present architecture is described with respect to a particular hardware embodiment that uses electrical voltages, resistances, and currents to perform the calculations of the ANN. This particular embodiment is used for the purpose of illustration, to provide an intuitive understanding of how the calculations of a neural network can be performed, but it should be understood that neural networks can also be implemented in software embodiments.

During feed-forward operation, a set of input neurons 402 each provide an input voltage in parallel to a respective row of weights 404. The weights 404 each have a settable resistance value, such that a current output flows from the weight 404 to a respective hidden neuron 406 to represent the weighted input. The current output by a given weight is determined as I=V/r, where V is the input voltage from the input neuron 402 and r is the set resistance of the weight 404. The current from each weight adds column-wise and flows to a hidden neuron 406. A set of reference weights 407 have a fixed resistance and combine their outputs into a reference current that is provided to each of the hidden neurons 406. Because conductance values can only be positive numbers, some reference conductance is needed to encode both positive and negative values in the matrix. The currents produced by the weights 404 are continuously valued and positive, and therefore the reference weights 407 are used to provide a reference current, above which currents are considered to have positive values and below which currents are considered to have negative values.

As an alternative to using the reference weights 407, another embodiment may use separate arrays of weights 404 to capture negative values. Each approach has advantages and disadvantages. Using the reference weights 407 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 404 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 406 use the currents from the array of weights 404 and the reference weights 407 to perform some calculation. The hidden neurons 406 then output a voltage of their own to another array of weights 404. This array performs in the same way, with a column of weights 404 receiving a voltage from their respective hidden neuron 406 to produce a weighted current output that adds row-wise and is provided to the output neuron 408.

It should be understood that any number of these stages may be implemented, by interposing additional layers of arrays and hidden neurons 406. It should also be noted that some neurons may be constant neurons 409, which provide a constant voltage to the array. The constant neurons 409 can be present among the input neurons 402 and/or hidden neurons 406 and are only used during feed-forward operation.

During back propagation, the output neurons 408 provide a voltage back across the array of weights 404. The output layer compares the generated network response to training data and computes an error. The error is applied to the array as a voltage pulse, where the height and/or duration of the pulse is modulated proportional to the error value. In this example, a row of weights 404 receives a voltage from a respective output neuron 408 in parallel and converts that voltage into a current which adds column-wise to provide an input to hidden neurons 406. The hidden neurons 406 combine the weighted feedback signal with a derivative of its feed-forward calculation and stores an error value before outputting a feedback signal voltage to its respective column of weights 404. This back propagation travels through the entire network 400 until all hidden neurons 406 and the input neurons 402 have stored an error value.

During weight updates, the input neurons 402 and hidden neurons 406 apply a first weight update voltage forward and the output neurons 408 and hidden neurons 406 apply a second weight update voltage backward through the network 400. The combinations of these voltages create a state change within each weight 404, causing the weight 404 to take on a new resistance value. In this manner the weights 404 can be trained to adapt the neural network 400 to errors in its processing. It should be noted that the three modes of operation, feed forward, back propagation, and weight update, do not overlap with one another.

In one particular embodiment, the weights 404 may be implemented in software or in hardware, for example using relatively complicated weighting circuitry or using resistive cross point devices. Such resistive devices may have switching characteristics that have a non-linearity that can be used for processing data. The weights 404 may belong to a class of device called a resistive processing unit (RPU), because their non-linear characteristics are used to perform calculations in the neural network 400. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

Figure 5:
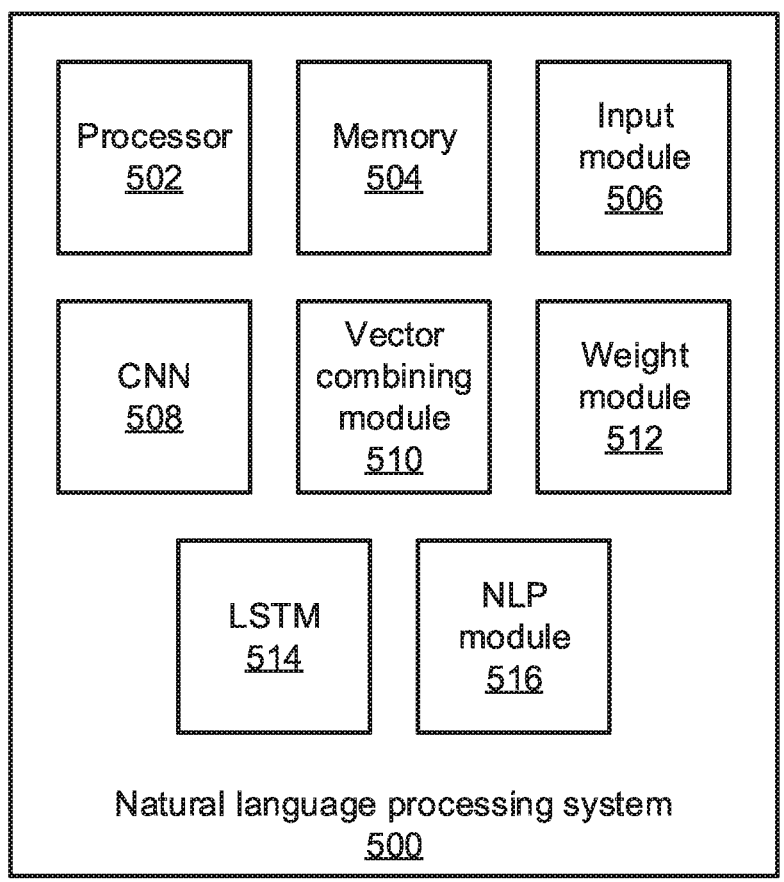
FIG. 5 is a block diagram of a natural language processing system that uses a multi-resolution context vector in accordance with an embodiment of the present invention.

Referring now to FIG. 5, a natural language processing system 500 is shown. The system 500 includes a hardware processor 502 and memory 504. The system 500 also includes one or more functional modules that can be implemented as software that is stored in memory 504 and executed by hardware processor 502. In other embodiments, one or more of the functional modules can be implemented as one or more discrete hardware components in the form of, e.g., application-specific integrated chips or field programmable gate arrays.

An input module 506 accepts input text from any appropriate source, tokenizes the input text into sentences and words, and generates vector embeddings of the input words in an appropriate space. A CNN 508 generates feature vectors using sequences of input words of different lengths. A weight module 512 determines attention weights $\beta_{im}$ that vector combining module 510 uses to combine the feature vectors at the different sequence lengths into a single vector $v_i$.

LSTM network 514 takes the vectors $v_i$ as an input, generating respective hidden states $h_i$. As noted above, the CNN 508 and the LSTM network 514 can be implemented as neural networks using dedicated hardware components or as software that is executed by the hardware processor 502.

The weight module 512 determines attention weights $\alpha_i$ that vector combining module 510 uses to generate a context vector. The natural language processing module 516 then uses the context vector to perform a natural language processing function. Because the context vector is sensitive to word sequences at a variety of different sequence lengths, the natural language processing output is able to capture the most appropriate meaning from a phrase. This improves natural language processing tasks such as, e.g., sentiment classification, machine translation, and language modeling. These represent substantive technical fields, and improvements to their ability to consider contextual information at multiple resolutions provide substantial benefits across a wide variety of disciplines.

Figure 6:
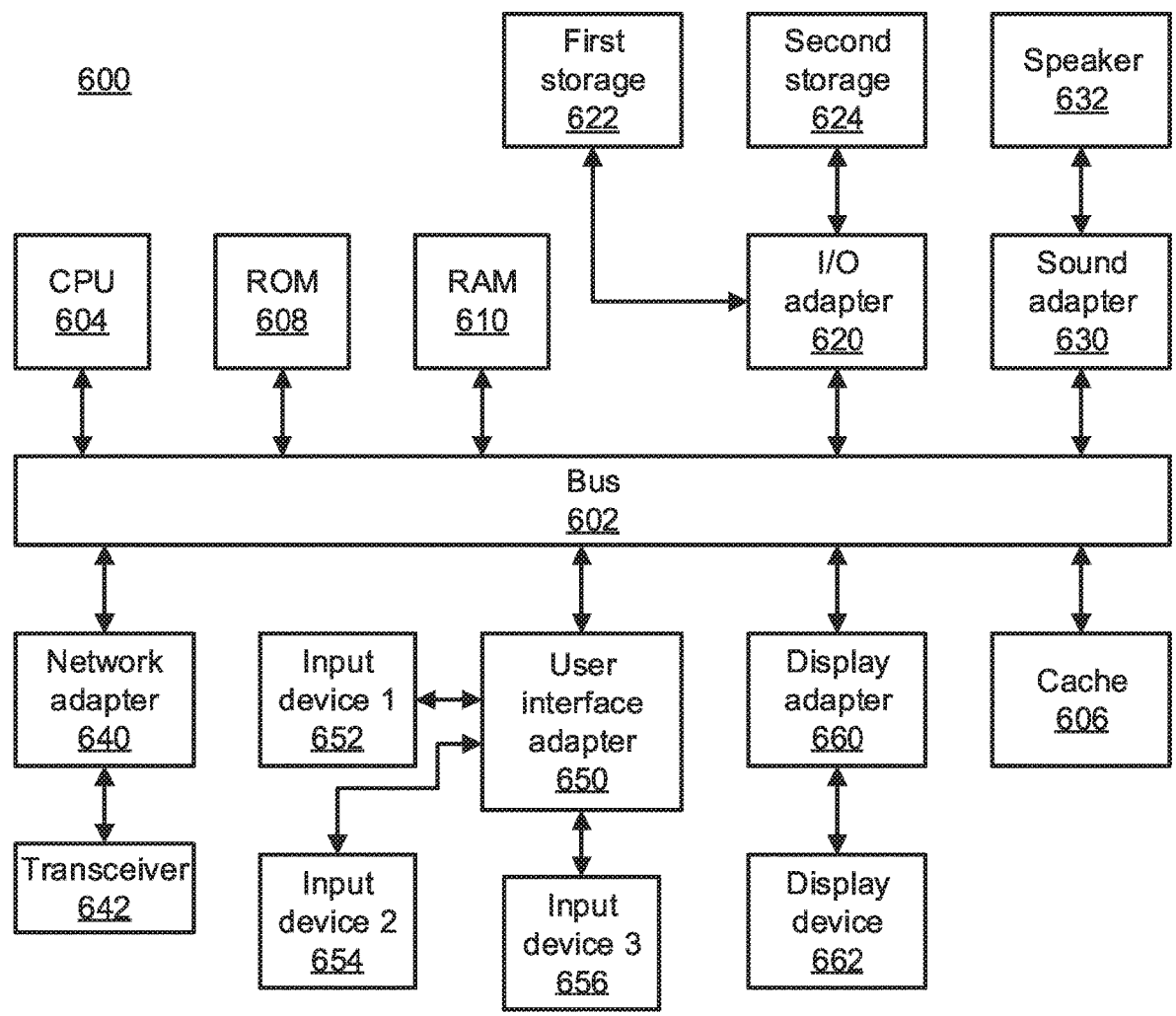
FIG. 6 is a block diagram of a processing system in accordance with an embodiment of the present invention.

Referring now to FIG. 6, an exemplary processing system 600 is shown which may represent the natural language processing system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Having described preferred embodiments of multi-resolution convolutional neural networks for sequence modeling (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims.

What is claimed is:

1. A computer-implemented method for natural language processing, comprising:
generating a respective plurality of feature vectors, for each word in an input, by applying a plurality of filters to sequences of input words of different respective lengths, with a filter applied to each sequence of input words at each respective length generating a respective feature vector;
combining the respective plurality of feature vectors for each word in the input to form a combined vector for each word;
determining a hidden state for each word in the input based on the combined vector, including applying the combined vector for each word to a recurrent neural network;
combining the hidden states for all words in the input to form a multi-resolution context vector; and
performing a natural language processing action, selected from the group consisting of sentiment classification, machine translation, and language modeling, using the multi-resolution context vector.

2. The computer-implemented method of claim 1, wherein applying the plurality of filters to each sequence comprises applying filters of a convolutional neural network.

3. The computer-implemented method of claim 2, further comprising training the convolutional neural network to update values of the plurality of filters.

4. The computer-implemented method of claim 1, wherein the plurality of filters are applied to respective sequences having lengths 3, 5, and 7.

5. The computer-implemented method of claim 1, wherein combining the respective plurality of feature vectors for each word comprises calculating a weighted sum of the respective plurality of feature vectors for each word.

6. The computer-implemented method of claim 1, wherein the recurrent neural network is a long-short term memory network.

7. The computer-implemented method of claim 1, wherein combining the hidden states for all words in the input comprises calculating a weighted sum of the hidden states.

8. A non-transitory computer readable storage medium comprising a computer readable program for natural language processing, wherein the computer readable program when executed on a computer causes the computer to perform the steps of:
generating a respective plurality of feature vectors, for each word in an input, by applying a plurality of filters to sequences of input words of different respective lengths, with a filter applied to each sequence of input words at each respective length generating a respective feature vector;
combining the respective plurality of feature vectors for each word in the input to form a combined vector for each word;
determining a hidden state for each word in the input based on the combined vector, including applying the combined vector for each word to a recurrent neural network;
combining the hidden states for all words in the input to form a multi-resolution context vector; and performing a natural language processing action, selected from the group consisting of sentiment classification, machine translation, and language modeling, using the multi-resolution context vector.

9. A system for natural language processing, comprising:
a first neural network configured to generate a respective plurality of feature vectors, for each word in an input, by applying a plurality of filters to sequences of input words of different respective lengths, with a filter applied to each sequence of input words at each respective length generating a respective feature vector;
a vector combining module configured to combine the respective plurality of feature vectors for each word in the input to form a combined vector for each word;
a second recurrent neural network configured to determine a hidden state for each word in the input based on the combined vector, wherein the vector combining module is further configured to combine the hidden states for all words in the input to form a multi-resolution context vector; and
a natural language processing module configured to perform a natural language processing action, selected from the group consisting of sentiment classification, machine translation, and language modeling, using the multi-resolution context vector.

10. The system of claim 9, wherein the first neural network is a convolutional neural network.

11. The system of claim 9, wherein the plurality of filters are applied to respective sequences having lengths 3, 5, and 7.

12. The system of claim 9, further comprising a weight module configured to calculate a weighted sum of the respective plurality of feature vectors for each word.

13. The system of claim 9, wherein the recurrent neural network is a long-short term memory network.

14. The system of claim 9, further comprising a weight module configured to calculate a weighted sum of the hidden states.

* * * * *